US005288358A

United States Patent [19]

Logan

[11] Patent Number: 5,288,358

[45] Date of Patent: Feb. 22, 1994

[54] SIGN MAKING WEB WITH DRY ADHESIVE LAYER AND METHOD OF USING THE SAME

[75] Inventor: David J. Logan, Glastonbury, Conn.

[73] Assignee: Gerber Scientific Products, Inc., Manchester, Conn.

[21] Appl. No.: 897,387

[22] Filed: Jun. 12, 1992

Related U.S. Application Data

[60] Continuation of Ser. No. 674,075, Mar. 21, 1991, abandoned, which is a division of Ser. No. 56,458, May 29, 1987, Pat. No. 5,026,584.

[51] Int. Cl.$^5$ .......... B32B 31/00

[52] U.S. Cl. .......... 156/268; 156/283; 156/295; 156/240; 156/269; 156/234; 156/267; 156/239; 156/248; 156/231; 156/230; 428/906; 428/914

[58] Field of Search .......... 156/268, 283, 295, 240, 156/269, 234, 267, 239, 248, 237, 230; 428/906, 914

[56] References Cited

U.S. PATENT DOCUMENTS

| | | | |
|---|---|---|---|
| 689,320 | 12/1901 | Markus | 156/239 |
| 748,427 | 12/1903 | Sicard | 156/239 |
| 2,641,562 | 11/1950 | Chartrand et al. . | |
| 3,297,508 | 1/1967 | Jahp | 156/268 |
| 3,432,376 | 3/1969 | Reed et al. | 428/914 |
| 3,459,626 | 8/1969 | Morgan | 156/239 |
| 3,505,142 | 4/1970 | Hammonds | 156/240 |
| 3,681,179 | 7/1970 | Theissen . | |
| 3,728,210 | 4/1973 | Piron . | |
| 3,959,555 | 5/1976 | Day et al. . | |
| 4,079,168 | 3/1978 | Schwemmer et al. | 156/330 |
| 4,342,614 | 8/1982 | Vanden Bergh . | |
| 4,372,070 | 2/1983 | Erlich . | |
| 4,467,525 | 8/1984 | Logan et al. . | |
| 4,550,683 | 11/1985 | Jones . | |
| 4,604,153 | 8/1986 | Melbye . | |
| 4,640,727 | 2/1987 | Janssen | 156/230 |
| 4,692,198 | 9/1987 | Borreson . | |
| 4,741,791 | 5/1988 | Howard et al. | 156/239 |
| 4,915,997 | 4/1990 | Yamamuro et al. . | |
| 4,919,994 | 4/1990 | Incremona et al. | 156/239 |
| 4,952,268 | 8/1990 | Beck et al. | 156/295 |
| 4,954,379 | 9/1990 | Nishida et al. . | |
| 5,059,462 | 10/1989 | Kurisu et al. . | |
| 5,143,576 | 9/1992 | Logan | 156/268 |

FOREIGN PATENT DOCUMENTS

| | | |
|---|---|---|
| 56-28626 | 7/1981 | Japan . |
| 58-26987 | 6/1983 | Japan . |
| 1356426 | 6/1974 | United Kingdom . |
| 2005596 | 4/1979 | United Kingdom . |
| 2187023 | 8/1987 | United Kingdom . |
| 2189433 | 10/1987 | United Kingdom . |

*Primary Examiner*—Patrick J. Ryan
*Assistant Examiner*—Merrick Dixon
*Attorney, Agent, or Firm*—McCormick, Paulding & Huber

[57] ABSTRACT

A laminated web is used for supplying characters, symbols or other shapes, which are cut from a layer of sign material comprising one of the layers of the web, subsequently adhesively attached to a supporting surface to create a sign. In the web the layer of sign material is superimposed on a layer of paper or similar material with an intervening layer of pressure sensitive or permanently tacky adhesive. A layer of dry adhesive is carried by the otherwise exposed face of the layer of sign material and is activatable into a tacky condition for adhesively attaching the underlying portions of the layer of sign material to a supporting surface. The arrangement of the layers, the types of adhesives and the bonding strengths of the adhesives to their adherent surfaces allow the shapes cut from the layer of sign material to be transferred to and adhesively attached to a supporting surface, after cutting, by a simple and easy process. If a number of shapes are cut at one time the construction of the web and the related process of transferral to the supporting surface assures that the shapes after the attachment to the supporting surface will have the same spacing, alignment and other arrangement relative to one another as in the cut web.

3 Claims, 5 Drawing Sheets

SIGN MAKING WEB WITH DRY ADHESIVE LAYER AND METHOD OF USING THE SAME

This is a continuation of co-pending application Ser. No. 07/674,075 filed on Mar. 21, 1991, now abandoned, which is a divisional of SN#07/056,458 filed on May 29, 1987, now U.S. Pat. No. 5026584.

BACKGROUND OF THE INVENTION

This invention relates to a laminated web used for making signs having characters, symbols and the like adhesively attached to a supporting surface, and deals more particularly with such a web simplifying the transfer of characters and other shapes cut from one layer of the web to the supporting surface and well adapted for use with an automatic sign machine such as shown by U.S. Pat. No. 4,467,525.

In the past it has been known, as disclosed for example in U.S. Pat. No. 4,467,525, when working with an automatic sign generating machine to use an essentially two-ply laminated web consisting of a base layer or carrier sheet holding a superimposed layer of sign making material, such as colored polyvinylchloride, with the two layers being separated by a thin layer of permanently tacky or pressure-sensitive adhesive relatively strongly adhered to the rear face of the sign material and relative weakly adhered to the adjacent face of the carrier sheet by virtue of that being coated with a film of silicone material or similar release agent. The front face of the layer of sign making material generally has a shiny or glossy appearance as compared to the rear face, since the front face is the face seen in the finished sign. In the use of the prior art web the automatic sign generating machine cuts through the layer of sign making material and only slightly, if at all, into the base layer as the knife is moved in the plane of the web to trace and therefore cut one or more closed shape characters, symbols or the like on and from the layer of sign material. After this cutting is completed the closed shape or shapes cut in the sign material are applied to a supporting surface to form a finished sign. The exact routine followed in advancing from the cut web to the finished sign may vary, but all known routines are fairly time consuming.

For example, in one common procedure after the web is cut the next step is to peel or "weed" the surrounding sign material away from the cut closed shapes leaving only the cut shapes behind on the involved portion of the base layer. That is, after the weeding the cut shapes stand by themselves on the associated area of the base layer and are held to the base layer by the intervening adhesive. Then a pressure-sensitive adhesive faced piece of auxiliary sheet is placed over the cut shape or shapes, adhesive side facing the cut shape or shapes, and pressed against the shapes to adhere the shapes to the auxiliary sheet. The adhesive for the auxiliary sheet is chosen so that the bond of the auxiliary sheet to the cut shape or shapes will be greater than the bond of the auxiliary shapes to the base layer. The auxiliary sheet is then lifted from the base layer and, because of the differential bonding mentioned, the shape or shapes (including the adhesive on their rear faces) during such lifting will move with the auxiliary sheet and release from the base layer. The auxiliary sheet is then placed over the supporting surface with the shape or shapes carried by it facing the surface, and the sheet is then pressed against the supporting surface to securely adhere the shape or shapes to the surface by means of the adhesive carried by its or their rear face or faces. The auxiliary sheet is then peeled from the supporting surface leaving the shape or shapes behind on the supporting surface, adhered to it by the adhesive carried by its or their rear face or faces. At this point it should be noted that the adhesive of the auxiliary sheet is further so selected that its strength of bonding to the shape or shapes is less than the strength of bonding of the shape or shapes to the supporting surface so that in the last peeling step the desired result of leaving the shape or shapes behind on the supporting surface is achieved.

One disadvantage associated with the prior art web described above is that the front face of the layer of sign material, which is the face seen in the finished sign, is exposed from the time of making the web to the time of its final use. As a result, it sometimes becomes embossed or scratched during the rolling of the web into rolls, the transport of the rolls, the unwinding of the web from the rolls, the cutting of the web by the sign making machine, and other handling procedures.

Another disadvantage of the above-described prior art web is that the adhesive layer between the base layer and the layer of sign material is relatively thick and tacky, and is strongly adhered to the sign material for adhesively attaching the cut sign shapes to a supporting surface. This layer of tacky adhesive has proven to be a nuisance both when cutting the sign material and when "weeding" the surrounding sign material from the cut sign shapes.

An object of the invention therefore is to provide a web of laminated material and a method for using the same whereby the procedure required for going from the cut web to a finished sign is greatly simplified in comparison to the prior art procedure described above, the procedure in particular not requiring the use of an auxiliary sheet for transferring cut characters or the like from the web to the supporting surface.

Another object is to provide a web of laminated material of the foregoing general character wherein the danger of marring the "good" face of the layer of sign material due to handling of the web between the time of its manufacture and the time of completing a sign is substantially reduced.

Other objects and advantages of the invention will be obvious from the following detailed description of a preferred embodiment of the invention.

SUMMARY OF THE INVENTION

The invention resides in a laminated web for use in making signs of the kind comprised of characters, symbols or other shapes cut from a sheet of colored sign material and adhesively attached to a supporting surface of contrasting color. The web is cut to provide the shapes used in constructing a sign and lends itself particularly well to situations where the cutting is performed on an automatic sign generating machine, but its use is not necessarily restricted to this application, it being possible that the web may also be used in circumstances where the shapes are cut by hand or by means other than an automatic machine.

The web comprises a base layer of sheet material carrying a superimposed layer of sign material. The layer of sign material has a first face facing the base layer and a second face facing away from the base layer. The first face is the better or "good" face of the sign material. A layer of permanently tacky adhesive of the web is located between the base layer and the layer of sign material and is preferentially bonded to the base layer to allow the sign material to be peeled from it with the adhesive remaining on the base layer only. The web further comprises a layer of dry adhesive bonded to the second face of the layer of sign material. This layer of dry adhesive is activatable to a tacky condition for adhesively attaching cut shapes of the sign material to a supporting surface.

In this construction of the web the "good" face of the sign material is protected by the base or carrier layer during handling and cutting and is not exposed until the end of the sign making process. This construction of the web also permits the use of a simple procedure in transferring the cut shapes of the sign material to the supporting surface after cutting, the procedure involving removing or "weeding" the surrounding sign material from the cut shapes, activating the dry adhesive remaining with the cut shapes into a tacky condition, applying the base layer with the cut shapes to the supporting surface, pressing the cut shapes against that surface to cause them to adhere to the surface, and lastly peeling the base layer from the surface leaving the attached shapes behind on the surface to complete the sign. Depending on the nature of the dry adhesive and its method of activation, the activation of the adhesive may occur either before or after the cut shapes are presented to the supporting surface.

The invention also resides in the method for using the web to produce a sign in the way described above.

DETAILED DESCRIPTION OF THE PREFERRED EMBODIMENT

Figure 1:
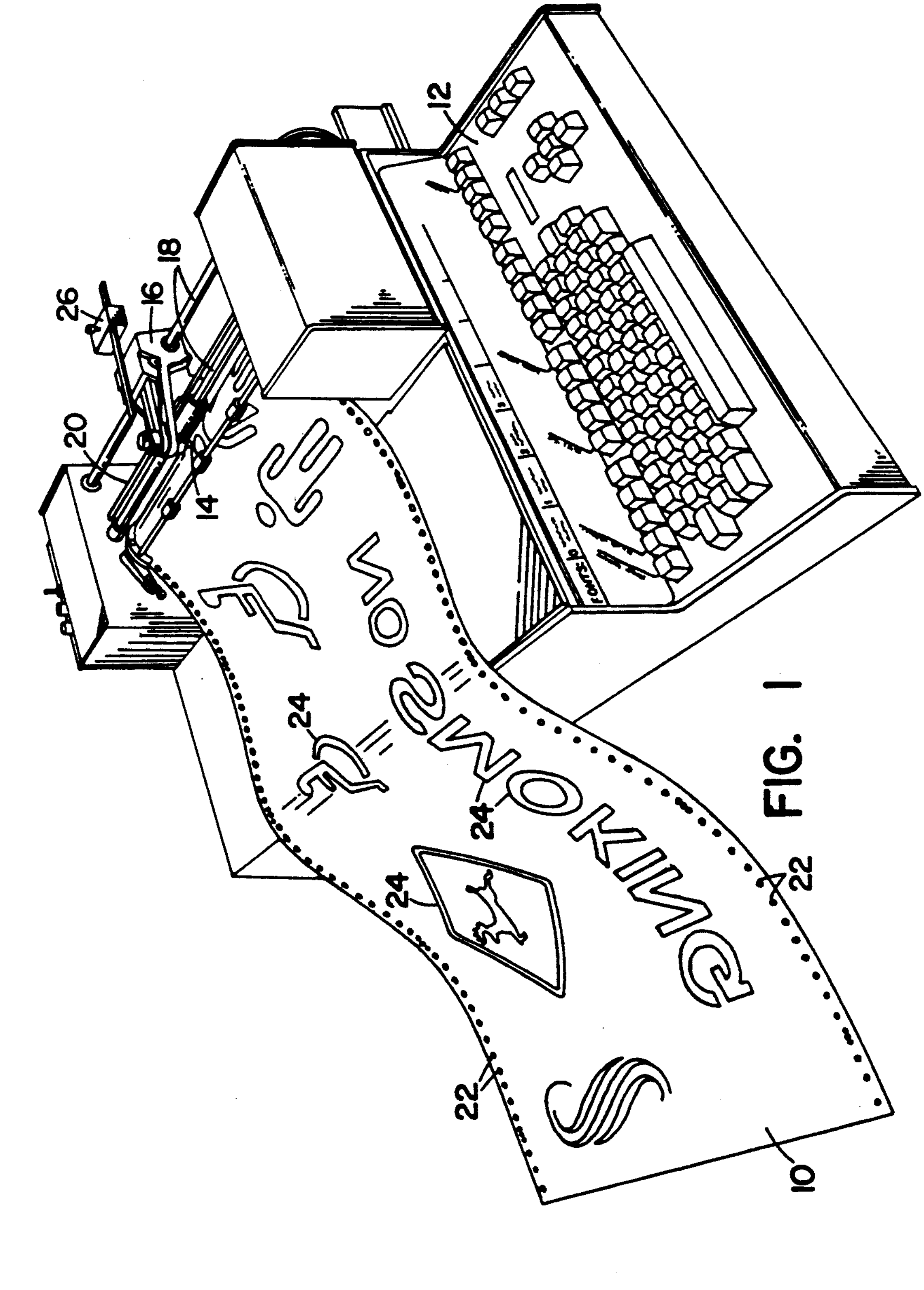
FIG. 1 is a perspective view showing a laminated web embodying this invention in the process of being cut on an automated sign making machine.

In FIG. 1 a web embodying the invention is illustrated at 10 and is shown in the process of being cut on an automated sign generating machine 12. The machine 12 may be generally similar to that shown in U.S. Pat. No. 4,467,525 to which reference may be made for further details of its construction. For the present it is sufficient to note that the machine 12 includes a knife 14, for cutting the web 10, mounted on a carriage 16 movable transversely of the web by sliding on two guiderails 18, 18, such movement being driven by a drive motor within the machine housing through a cable 20. Movement in the other coordinate direction, that is longitudinally of the web, is effected by a pair of nonillustrated drive sprockets which engage feed holes 22, 22 located in the opposite marginal edge portions of the web. Between the two marginal edge portions is the work area of the web. Therefore, by combined movement of the web in the longitudinal coordinate direction and the carriage 16 in the transverse coordinate direction the knife 14 may be made to trace and cut any desired line on the work area of the web 10 to produce cut characters, symbols or other shapes such as shown for example at 24 in FIG. 1.

The pressure of the knife 14 on the web 10 during cutting is controllable by a counterweight 26 so that the depth of penetration of the blade can be adjusted and held at a substantially constant value. The depth of penetration, as explained in more detail hereinafter, is such that during the cutting process the web is cut through less than the full extent of its thickness.

Figure 2:
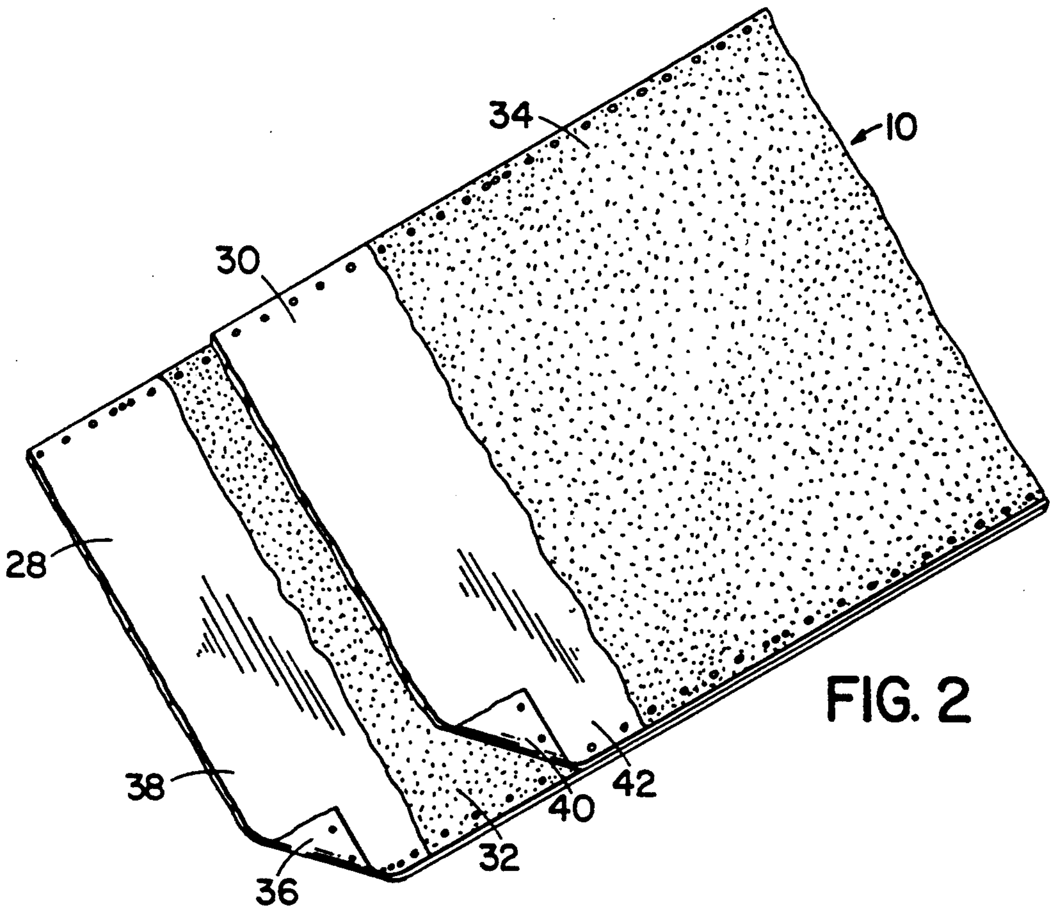
FIG. 2 is a perspective view of a portion of the web of FIG. 1 with parts of the various layers being shown broken away to reveal underlying layers.
Figure 3:
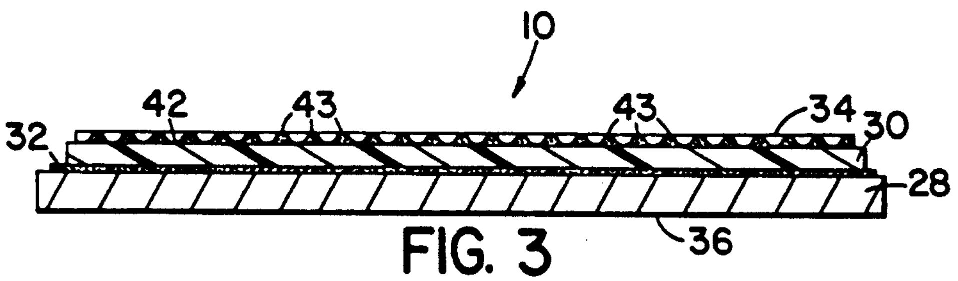
FIG. 3 illustrates another embodiment of the web of FIG. 1 and is a fragmentary sectional view taken through the web wherein the thickness of the various layers have been exaggerated for clarity, this embodiment involving the addition of microballoons containing an activator for activating the adhesive of the dry adhesive layer.

FIGS. 2 and 3 show in further detail the construction of the web 10 of FIG. 1 made in accordance with this invention. The web is comprised of a base layer or carrier sheet 28 and a superimposed layer or sheet of sign material 30. Further, the web has a layer of permanently tacky adhesive 32 between the base layer 28 and the layer of sign material 30, and a layer of dry adhesive 34 on top of the layer of sign material 30. The materials selected for the sheets 28 and 30 and for the adhesive layers 32 and 34 may vary, but in a preferred case the base layer 28 is made of relatively heavy paper such as, for example, paper of eighty pound stock giving it a thickness of 8 to 10 mils. The layer 30 of sign material is preferrably made of a colored flexible plastic, such as polyvinylchloride, having a thickness on the order of 2 to 4 mils.

As seen in FIG. 2 the base layer 28 has a first face 36 and a second face 38; and the layer of sign material 30 has a first face 40 and a second face 42. The first faces 36 and 40 face downwardly and the second faces 38 and 42 face upwardly. When the plastic sheet material used for the layer of sign material 30 has different finishes on its faces prefererably the better appearing, or "good", face is the one chosen to be the face 40, as this is the face seen in the finished sign. For instance, a commonly available polyvinylchloride sheet material has one relatively smooth or glossy face and one less smooth, non-glossy face, and when such sheet is used for the layer 30 the glossy face is preferrably chosen to be the face 40.

The faces 38 and 40 are the adherents for the adhesive layer 32, and the face 42 is the adherent for the adhesive layer 34. The adhesive used for the layer 32 is a permanently tacky or pressure-sensitive one such as any one of a number of well-known synthetic rubber based materials. The adhesive used for the layer 34 is a dry adhesive which is bonded to the face 42 in dry condition, but, which may be activated into a tacky condition to adhere the underlying portion of the sign material 30 to a supporting surface. The adhesive of the layer 34 is or may be any one of a number of well-known dry adhesives, such as those activated upon the application of a liquid, for example water or alcohol, or those activated upon the application of heat, or those activated by microwaves or other types of radiation.

In another embodiment of the web 10 shown in FIG. 3 the adhesive of the adhesive layer 34 is liquid activated and the adhesive layer 34 has a plurality of microballoons 43 43 which are dispersed throughout the adhesive and which each contain an adhesive activating liquid. The microballoons 43, 43 are constructed to break open on the application of pressure to activate the adhesive into a tacky condition. The microballoons 43, 43 may be activated, for example, by placing the web 10 against a supporting surface such that the face 42 of sign material 30 faces the supporting surface and by then applying pressure against the overlying portions of the base layer 28 to cause the underlying microballoons to rupture and release the activator to turn the dry adhesive to a tacky state to adhesively attach the sign material to the supporting surface. Instead of being dispersed in the body of the dry adhesive layer 34 the microballoons may also in some cases be provided in the form of a separate layer on top of the layer 34.

With regard to the adhesive layer 32, the adhesive used for this layer and the associated adherent faces 38 and 40 are so related that the adhesive bonds more strongly to the face 38 than the face 40. Further, the interface between the adhesive layer 32 and the face 40 is such that the sign material of the layer 30 may be peeled from the adhesive layer 32 with the adhesive in the course of such peeling coming entirely free from the surface 40 and remaining on the surface 38 of the base layer 28. This type of interface or release property between the face 40 and the adhesive layer 32 may be obtained by using as the layer of sign material 30 a sheet having a relatively glossy or smooth surface for the face 40. In addition to, or as an alternate to having the face 40 being a glossy one, it may also be coated with a film of release agent such as a silicone material.

Additionally, the adhesive of the layer 32 is so selected, that when a portion of the dry adhesive layer 34 is activated into a tacky condition and adhered to a supporting surface, the bonding force between the adhesive layer 34 and both the face 42 of the sign material and the supporting surface will be greater than the bonding force between the face 40 and the adhesive layer 32. To aid in achieving this relationship of bonding strengths the adhesive layer 34 may be made to be more tacky when activated than the adhesive layer 32. This can be done by using an adhesive of greater tackiness when activated for layer 34 than that of layer 32, and additionally, or in the alternative, it may be achieved by making the layer 32 a relatively thin layer in which the adhesive is sparsely distributed and the layer 34 a relatively thick layer using more adhesive per unit area. The desired relationship of bonding strengths may also be obtained or enhanced by providing the face 40 of the layer of sign material with a film of release agent or otherwise conditioning it so as to yield a very low bonding strength between the face 40 and the adhesive layer 32, thereby making the layer of sign material easily strippable from the adhesive layer 32.

Figure 4:
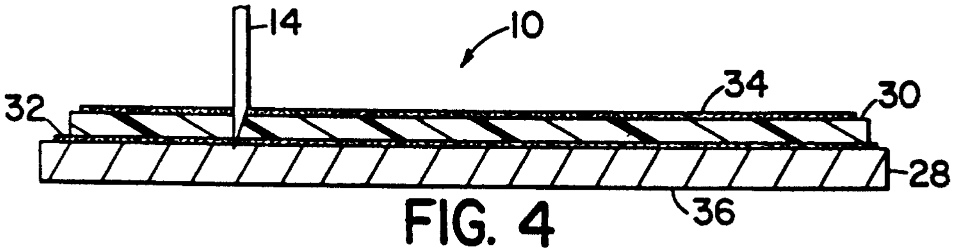
FIG. 4 is a fragmentary sectional view taken through the web of FIG. 1 wherein the thicknesses of the various layers have been exaggerated for clarity, the view showing the degree of penetration of a knife during the cutting of the web.

FIG. 4 illustrates, in addition to the construction of the web 10, the typical degree of penetration of the blade 14 when cutting shapes in the web 10. From this it can be seen that the blade 14 penetrates completely through the layer of sign material 30, as well as completely through the two adhesive layers 32 and 34, but it only partially, if at all, penetrates the base layer 28. Therefore, when the blade 14 traces a given closed shape on the web 10 it cuts such shape from the layer of sign material 30 and leaves the base layer 28 intact.

Figure 5:
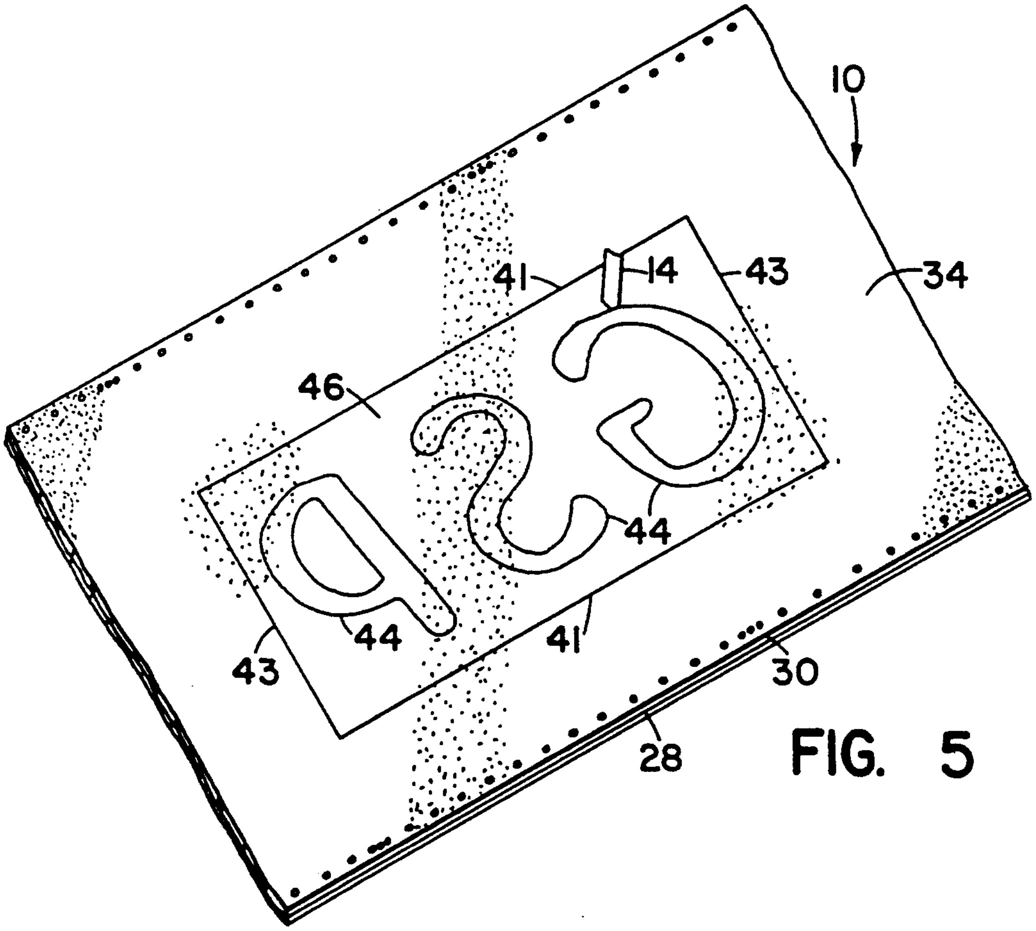
FIGS. 5 to 8 are views showing a portion of the web of FIG. 1 and illustrating in sequence the steps followed in using the web to create a sign.

Reference is now made to FIGS. 5 to 8 for a discussion of the manner in which the previously described web 10 is used to construct a sign on a given supporting surface. The first step, as shown in FIG. 5, is to cut one or more characters, such as the illustrated characters 44, 44, using the blade 14. The shapes are cut to be the reverse or mirror images of the desired shapes, as viewed in FIG. 5. The blade 14 is applied from a position above the layer of sign material 30 and as previously indicated in FIG. 4 extends entirely through the layer of sign material 30 during the cutting process and penetrates only slightly if at all the base layer 28. As a result the cut characters 44, 44 which appear in the layer of sign material 30 are completely separated from the remainder of the layer of sign material. These characters are held in place by the uncut base layer 28 and adhesive layer 32.

After (or before) the characters 44, 44 are cut as shown in FIG. 5, a portion 46 of the layer of sign material 30 which contains the characters 44, 44 is cut along boundary lines 41, 43, using the blade 14, to separate it from the remainder of the layer 30.

Figure 6:
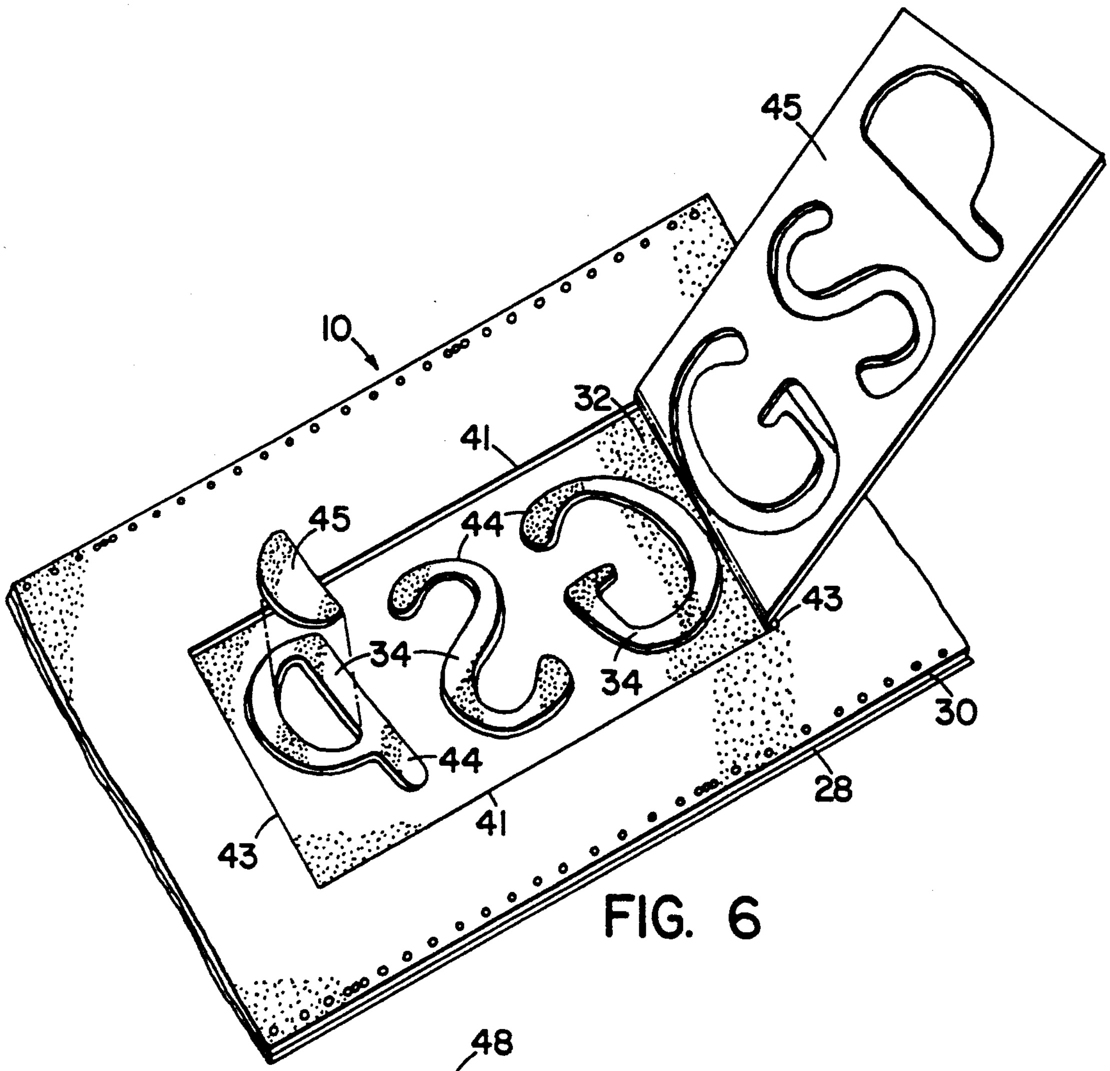

After the characters 44, 44 and boundary lines 41, 43 have been cut, the waste material 45, that is the material of the layer 30 falling within the boundary lines 41, 43 but not forming part of the characters, is removed or "weeded" from the layer 30 to leave behind on the base layer 28 the characters 44, 44 in free standing form, as illustrated in FIG. 6. Tweezers or a pointed pick-type tool may conveniently be used to effeciently perform this weeding step. The boundary lines are spaced far enough away from the characters that the dry adhesive on the characters may be activated without inadvertantly activating the dry adhesive on the material 30 outside of the boundary lines 41, 43. Alternatively, the web may be cut by a scissors (or by the blade 14) along the boundary lines 41, 43 to cut through the base layer 28 and thereby separate the portion of the base layer containing the characters from the remainder of the web. This portion of the base layer is thereafter used by itself to finish the sign and contains no dry adhesive, other than that on the attached characters 44, 44, which can be inadvertantly activated.

Figure 7:
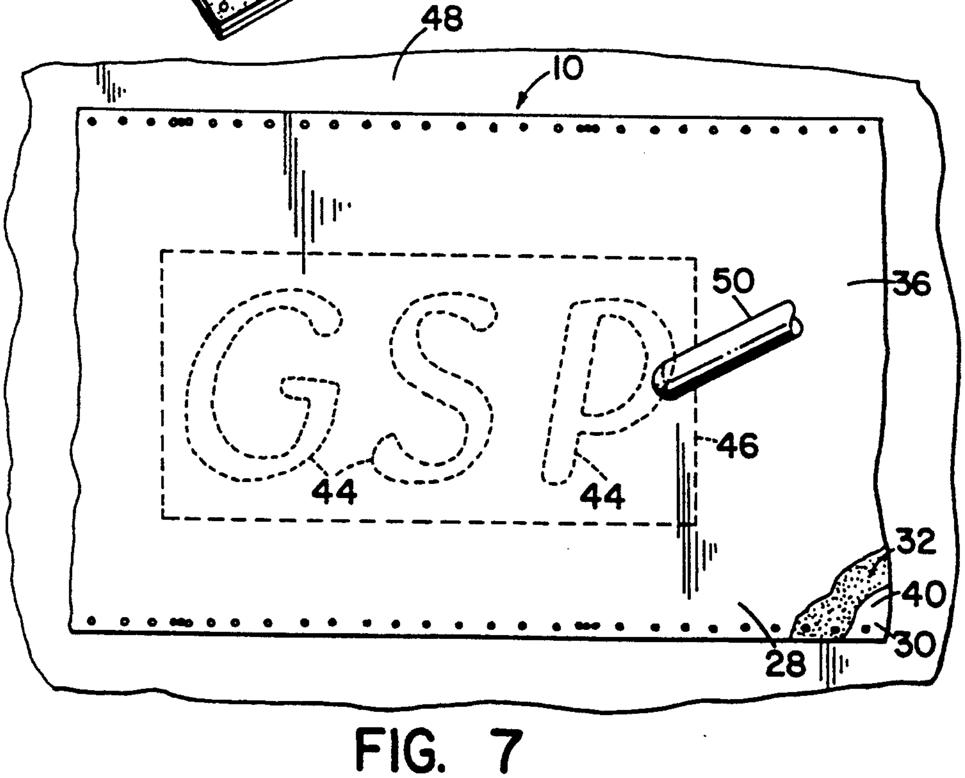

After weeding, the adhesive of the dry adhesive layer 34 overlying the characters 44, 44 is activated into a tacky condition. This may be done before or after the presentation of the characters to a supporting surface. In the case of a liquid activated adhesive, for example, immediately after weeding the adhesive layer covering the characters may be wetted with the proper liquid by using a sponge. The web 10 is then transferred to and laid against a supporting surface 48, as shown in FIG. 7, with the exposed portion of the adhesive layer 32 facing the supporting surface 48. The characters 44, 44 cut from the layer 30 of sign material are then firmly adhered to the supporting surface by pressing the web 10 against the supporting surface by means of a force applied to the base layer 28 in the area overlying the characters 44, 44. This may be done by pressing the base layer 28 with the thumb or finger of the user or by burnishing the base layer 28 with a burnishing tool 50 as shown in FIG. 7. It will be understood that the pressing or burnishing is to bring the activated portions of the adhesive layer 34 overlying the characters 44, 44 into firm adhering contact with the supporting surface 48 so that the cut characters 44, 44 of the layer of sign material 30 become strongly bonded to the supporting surface. It is also possible, when the adhesive of layer 32 is activated by liquid to spray the liquid onto the supporting surface and to then activate the adhesive by pressing the characters against such wetted surface.

In the case of a heat activated adhesive forming the layer 32, the activation may take place by placing the characters against a supporting surface and then pressing them against such surface by a heated iron applied to the base layer 28. Of course, various different kinds of activation can be envisioned and employed in accordance with the type of dry adhesive used.

Figure 8:
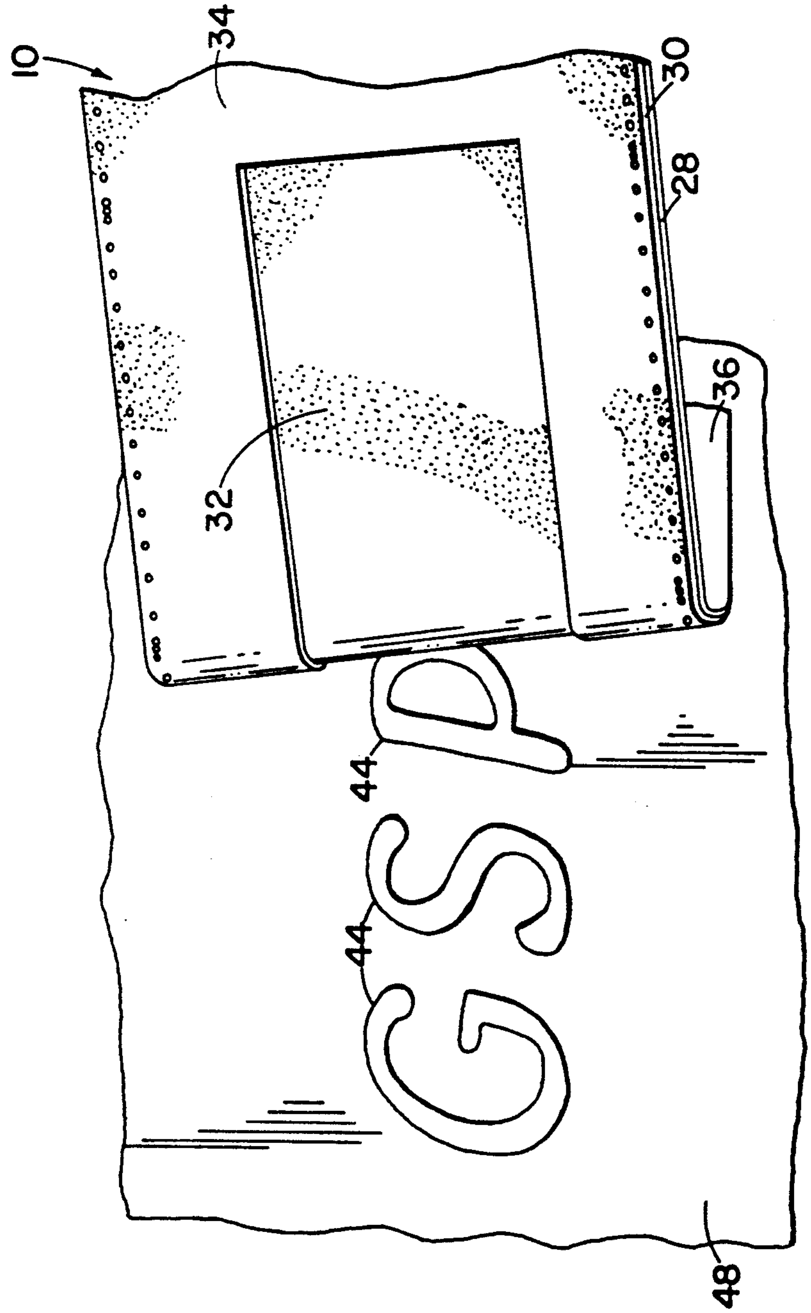

The last step in the construction of a sign, as shown in FIG. 8, is to peel the base layer 28 from the supporting surface 48 leaving behind the characters 44, 44 which are now adhered to the supporting surface 48. As noted previously the bonding forces between the layer of adhesive 32 and the involved adherent surfaces are such that this transferral will occur. If need be or desired, after the characters 44, 44 are transferred to the supporting surface 48 as shown in FIG. 8, they may be pressed again toward the supporting surface using a roller or other pressing means to obtain a still stronger bond.

It will be understood that if the dry adhesive layer 34 has microballoons 43, 43, containing an adhesive activating liquid, as previously described in connection with FIG. 3, the adhesive of the layer 34 overlying the characters 44, 44, may be activated into a tacky condition during the step when the web 10 is transferred to and pressed against the supporting surface 48.

It should be noted that in using the described web 10 and the procedure of FIGS. 5 to 8 for applying the cut characters to a supporting surface the characters as they finally appear on the supporting surface 48 will have the same spacing, orientation and other relationships to one another as they do in the initially cut web of FIG. 5. There is no need, as in the making of signs by some prior art procedures, to accurately align, space and orient the characters one by one as they are applied to the supporting surface, nor is there a need to use an adhesively backed auxiliary sheet to transfer the characters from the web to the supporting surface.

I claim:

1. A method for use in making a sign, said method comprising:

providing a laminated web comprised of a base layer of sheet material having first and second faces, a layer of plastic sign material in sheet form superimposed on said base layer and having a first face facing said base layer and a second face facing away from said base layer, a layer of permanently tacky adhesive between said base layer and said layer of plastic sign material, and a layer of activatable adhesive bonded to said second face of said layer of sign material and activatable into a tacky condition from an otherwise dry condition, said adhesive of said layer of permanently tacky adhesive and the materials constituting said base layer and said layer of plastic sign material being such that said adhesive of said layer of permanently tacky adhesive adheres more strongly to said second face of said base layer than to said first face of said layer of plastic sign material allowing said layer of plastic sign material to be peeled from said layer of permanently tacky adhesive with said permanently tacky adhesive in the course of such peeling remaining on said base layer and coming completely free of said layer of plastic sign material, said activatable adhesive in its tacky condition having a greater adhesion strength than said permanently tacky adhesive, maintaining said activatable adhesive in a dry condition, cutting a closed shape in said web by first cutting completely through said activatable adhesive while in a dry condition and then into said layer of sign material and finally no more than partially into said base layer to separate a shape portion of the layer of plastic sign material defining said closed shape from a waste portion of said layer of plastic sign material and to separate the portion of said layer of activatable adhesive associated with said shape portion of said layer of plastic sign material from that portion of said layer of activatable adhesive associated with said waste portion of said layer of plastic sign material, removing from said web said waste portion of said layer of plastic sign material and the portion of said layer of activatable adhesive associated with said waste portion to leave said shape portion of the layer of plastic sign material and the portion of said layer of activatable adhesive associated therewith on said base layer in free standing form, attaching said shape portion of said layer of plastic sign material to a supporting surface by activating the activatable adhesive associated therewith from a dry to a tacky condition and then placing said web against a supporting surface with the activated adhesive facing said supporting surface, said substeps of activating said activatable adhesive and of placing said web against a supporting surface being carried out in any sequence, pressing said shape portion of said layer of sign material toward said supporting surface by a force applied to said first face of said base layer in the area overlapping said shape portion of said layer of sign material such that the activated activatable adhesive causes said shape portion of said layer of sign material to adhere to said supporting surface, and then peeling said web from said supporting surface to remove said shape portion of said layer of sign material from the remainder of said web through the intermediary of the selected relative adhesion strengths between the layer of permanently tacky adhesive and the tackified activatable adhesive and to leave it attached to said supporting surface due to the adhesive effect of that portion of said layer of activatable adhesive associated with said shape portion of said layer of plastic sign material.

2. A method for use in making a sign according to claim 1, further characterized by said dry adhesive having associated with it a plurality of microballoons containing a liquid which activates said dry adhesive, and activating said dry adhesive by applying a force to said first face of said base layer in the area overlapping said closed shape so as to rupture said microballoons and release said liquid.

3. A method for use in making a sign according to claim 1, further characterized by said dry adhesive being one activatable by heat, and activating said dry adhesive by applying heat to it.

* * * * *